United States Patent [19]

Tyrpin et al.

[11] Patent Number: 5,545,415

[45] Date of Patent: Aug. 13, 1996

[54] LOW MOISTURE CHEWING GUM COMPOSITIONS CONTAINING ERYTHRITOL

[75] Inventors: Henry T. Tyrpin, Midlothian; Kevin B. Broderick, Berwyn; David W. Record, River Forest, all of Ill.

[73] Assignee: Wm. Wrigley Jr. Company, Chicago, Ill.

[21] Appl. No.: 175,588

[22] Filed: Dec. 30, 1993

Related U.S. Application Data

[63] Continuation-in-part of PCT/US93/09354, Sep. 30, 1993, which is a continuation-in-part of PCT/US93/08730, Sep. 15, 1993.

[51] Int. Cl.$^6$ ....................................................... A23G 3/30
[52] U.S. Cl. ................................................ 426/3; 426/658
[58] Field of Search ................................... 426/3–6, 548, 426/658

[56] References Cited

U.S. PATENT DOCUMENTS

| | | | |
|---|---|---|---|
| 3,899,593 | 8/1975 | Hammond et al. | 426/3 |
| 4,065,578 | 12/1977 | Reggio et al. | 426/3 |
| 4,382,963 | 5/1983 | Klose et al. | 426/3 |
| 4,902,525 | 2/1990 | Kondou | 426/548 |
| 4,931,294 | 6/1990 | Yatka et al. | 426/3 |
| 4,933,188 | 6/1990 | Cherukuri et al. | 426/3 |
| 5,080,916 | 1/1992 | Kondou | 426/548 |
| 5,120,550 | 6/1992 | Van der Schueren | 426/3 |
| 5,156,866 | 10/1992 | Sato et al. | 426/5 |

FOREIGN PATENT DOCUMENTS

| | | |
|---|---|---|
| 0009325A1 | 4/1980 | European Pat. Off. . |
| 0325790A2 | 8/1989 | European Pat. Off. . |
| 0497439A1 | 8/1992 | European Pat. Off. . |
| 0511761A1 | 11/1992 | European Pat. Off. . |
| 0530995A1 | 3/1993 | European Pat. Off. . |
| 56-18180 | 4/1981 | Japan . |
| 64-51045 | 2/1989 | Japan . |
| 1-225458 | 9/1989 | Japan . |
| 2-104259 | 4/1990 | Japan . |
| 4-287659 | 10/1992 | Japan . |
| 4-287658 | 10/1992 | Japan . |
| 5-137535 | 6/1993 | Japan . |
| WO93/00828 | 1/1993 | WIPO . |

*Primary Examiner*—Jeanette Hunter
*Attorney, Agent, or Firm*—Steven P. Shurtz; Willian Brinks Hofer Gilson & Lione

[57] ABSTRACT

Chewing gum containing gum base, powdered erythritol, flavor and less than 2% moisture has an improved shelf life, i.e., does not absorb significant amounts of water from the atmosphere to soften with age, or give off significant amounts of water to the atmosphere to harden or stiffen with age.

18 Claims, 7 Drawing Sheets

LOW MOISTURE CHEWING GUM COMPOSITIONS CONTAINING ERYTHRITOL

This application is a continuation-in-part of PCT Application Ser. No. PCT/US93/09354 filed Sep. 30, 1993, designating the United States, which is hereby incorporated by reference. This application is also a continuation-in-part of PCT application Ser. No. PCT/US93/08730 filed Sep. 15, 1993, designating the United States.

BACKGROUND OF THE INVENTION

This invention relates to chewing gum. More particularly, it relates to a low moisture chewing gum which contains erythritol and has an improved shelf life.

In recent years, efforts have been devoted to replacing sugar and sugar syrups normally found in chewing gum with other carbohydrates and noncarbohydrates. Non-sugar or sugar-free chewing gum, which is growing in popularity, uses sugar alcohols or polyols to replace sugar and sugar syrups. The most popular polyols are sorbitol, mannitol and xylitol. New polyols are being developed using new technology to replace these polyols. New polyols have various unique properties which can improve the taste, texture and shelf life properties of chewing gum for consumers. The non-sugar polyols have the advantage of not contributing to dental caries of consumers, as well as being able to be consumed by diabetics.

Moisture gain has been known to have particularly harmful effects on the shelf life of gum products. In the case of anhydrous sugarless chewing gums, it is advantageous to provide gum compositions with a low moisture content in order to prevent deleterious effects of water on, among other things, high-intensity sweeteners such as aspartame etc. Thus, in order to retain acceptable sweetness, flavor and texture while retaining good shelf life, it is important that low moisture gums not pick up moisture from the environment. Also, many polyols cause gastric distress when consumed in too great of quantities. Therefore it would be desirable to use a non-cariogenic sweetener that did not cause gastric distress.

U.S. Pat. No. 5,120,550 discloses a chewing gum made with a sweetening agent containing erythritol and a liquid sugar alcohol.

EPO Patent Publication No. 0 009 325 and Japanese Patent Publication No. 81-18180 disclose a method of reducing dental caries with a sugarless chewing gum made with erythritol.

Low caloric sweetening compositions containing mesoerythritol are disclosed in U.S. Pat. Nos. 5,080,916 and No. 4,902,525, EPO Patent Publication No. 0 325 790, and Japanese Patent Publications No. 89-225458 and No. 90-104259.

Japanese Patent No. 89-51045 discloses chewing gum made with a melted mixture of mesoerythritol and sugars or sugar alcohols.

EPO Patent Publication No. 0 497 439 discloses a sweetener employing the use of spray dried erythritol.

EPO Patent Publication No. 0 511 761 discloses a sweetening composition made up of erythritol, sorbitol, and a glucose oligomer.

PCT Publication No. W093/00828 discloses a stabilized dipeptide sweetening composition which is useful in chewing gum and may contain erythritol.

Other patents and publications which discuss erythritol include Japanese Patent Publications No. 92-287658 and No. 92-287659, both published Oct. 13, 1992, (sweetening compositions containing mesoerythritol); and European Patent Publication No. 0 530 995, published Mar. 10, 1993, (lozenge containing sweetener which is all or partly erythritol or maltitol).

U.S. Pat. No. 4,931,294 discloses an environmentally stable chewing gum composition containing xylitol, gum base and flavor, but no added water or hygroscopic ingredients.

Erythritol does not contribute to dental caries, does not significantly contribute to calories and does not cause gastric distress like some other polyols. Thus, this ingredient's use in chewing gum could be a definite improvement. Also, it has been discovered that chewing gum compositions with erythritol do not pick up moisture from the atmosphere.

SUMMARY OF THE INVENTION

According to the present invention, there is provided a low moisture chewing gum composition which has improved shelf life. In a first aspect of the invention, the chewing gum comprises:

a) from about 5% to about 95%, preferably from about 10% to about 50%, and more preferably from about 20% to about 30%, by weight of the gum, of gum base;

b) from about 4.9% to about 94.9%, preferably from about 28% to about 69%, and more preferably from about 43% to about 59%, by weight of the gum, of powdered erythritol; and c) from about 0.1% to about 10%, of preferably from about 0.5% to about 3.0%, by weight of the gum of flavor;

d) the gum composition containing less than 2% of water.

In a second aspect, the invention is a sugarless, substantially anhydrous chewing gum composition comprising in weight percent:

a) a gum base in an amount of from about 5% to about 95%;

b) a low-moisture pick-up, texturizing sweetening/bulking agent comprising powdered erythritol in an amount from about 4.9% to about 94%; and c) a flavoring agent of from about 0.1% to about 10%; and d) wherein said erythritol provides to the gum composition textural integrity, a soft chew characteristic over a period of time, and reduced moisture pick-up, and maintains the gum composition in its substantially anhydrous state.

In a third aspect, the invention is a method of giving a chewing gum composition an improved shelf life comprising the steps of:

a) formulating the chewing gum composition with about 5% to about 95% gum base, about 4.9% to about 94% powdered erythritol and about 0.1% to about 10% flavor;

b) making the gum composition with less than 2% moisture; and c) storing the chewing gum composition for at least 28 days before chewing the chewing gum composition.

Because of erythritol's low hygroscopic nature, chewing gum made with erythritol does not absorb significant amounts of water from the atmosphere, which would cause the gum to soften. Also, the low moisture content of the gum prevents the gum from losing significant amounts of water at low relative humidity (RH) conditions, which would cause the gum to harden or stiffen with age. The chewing gum of the present invention thus has an improved shelf life.

DETAILED DESCRIPTION OF THE INVENTION AND PREFERRED EMBODIMENTS

All percentages herein are weight percentages unless otherwise specified. The term "chewing gum" also includes bubble gum and the like.

The present chewing gum compositions contain powdered erythritol, which has been discovered to be an excellent replacement for the sugar alcohol usually contained in sugarless gums, especially those prepared with sorbitol as a sweetening/bulking agent.

Erythritol is a tetrahydric polyol or sugar alcohol, having the empirical formula $C_4H_{10}O_4$ and the structural formula $CH_2COH—CHOH—CHOH—CH_2OH$. It can be obtained by fermenting glucose with specially selected yeast strains in appropriate aqueous nutrient media, or by treating an aqueous alkali carbonate solution of 2-buten-1,4-diol with chlorine, and saponifying the resulting chlorohydrin. Erythritol is available from Mitsubishi Kasei America, Inc., 81 Main Street, White Plains, N.Y. 10601; and from Mitsubishi Kasei Corp., outside the United States, as a powder with a melting point of about 119° C. It has a sweetness level of about 75% of that of sucrose, and has good storage stability. Its solubility in water at room temperature is 40%. Erythritol is not approved for use in human food products or chewing gum in the United States. A GRAS affirmation petition for erythritol as a human food ingredient is being prepared by Mitsubishi Kasei Corp. Erythritol does not contribute to dental caries, does not cause gastric distress, and does not contribute significantly to caloric intake, giving a highly acceptable gum product.

In general, a chewing gum composition typically contains a chewable gum base portion which is essentially free of water and is water-insoluble, a water-soluble bulk portion and flavors which are typically water insoluble. The water-soluble portion dissipates with a portion of the flavor over a period of time during chewing. The gum base portion is retained in the mouth throughout the chew.

The chewing gum compositions of the present invention follow the general pattern outlined above. They are made with erythritol as an ingredient in the bulk portion. The product is environmentally stable by virtue of the fact that it will resist softening and stiffening with age due to moisture gain or loss, respectively, or due to crystalline changes. It is believed that texture stability is increased by slowing crystalline changes.

The insoluble gum base generally comprises elastomers, elastomer solvents, plasticizers, waxes, emulsifiers and inorganic fillers. Plastic polymers, such as polyvinyl acetate, which behave somewhat as plasticizers, are also often included. Other plastic polymers that may be used include polyvinyl laurate, polyvinyl alcohol and polyvinyl pyrrolidone.

Elastomers may include polyisobutylene, butyl rubber, (isobutylene-isoprene copolymer) and styrene butadiene rubber, as well as natural latexes such as chicle. Elastomer solvents are often resins such as terpene resins. Plasticizers, sometimes called softeners, are typically fats and oils, including tallow, hydrogenated and partially hydrogenated vegetable oils, and coca butter. Commonly employed waxes include paraffin, microcrystalline and natural waxes such as beeswax and carnauba. Microcrystalline waxes, especially those with a high degree of crystallinity, may be considered bodying agents or textural modifiers.

The gum base typically also includes a filler component. The filler component may be calcium carbonate, magnesium carbonate, talc, dicalcium phosphate or the like. The filler may constitute between about 5% and about 60% by weight of the gum base. Preferably, the filler comprises about 5% to about 50% of the gum base.

Emulsifiers, which sometimes also have plasticizing properties, include glycerol monostearate, lecithin and glycerol triacetate. Further, gum bases may also contain optional ingredients such as antioxidants, colors and flavors.

According to the preferred embodiment of the present invention, the insoluble gum base constitutes between about 5% to about 95% of the gum. More preferably the insoluble gum base comprises between 10% and 50% of the gum and most preferably about 20% to about 30% of the gum. The present invention contemplates employing any commercially acceptable gum base.

The water-soluble portion of the chewing gum may further comprise softeners, sweeteners, flavoring agents and combinations thereof. The sweeteners often fulfill the role of bulking agents in the gum. The bulking agents typically comprise about 5% to about 95% of the gum composition. In the present invention, erythritol will be used for all or part of the sweetener/bulking agent. The erythritol will comprise from about 4.9% to about 94%, preferably from about 28% to about 69%, and most preferable from about 43% to about 59% of the gum composition.

Softeners are added to the chewing gum in order to optimize the chewability and mouth feel of the gum. Softeners, also known in the art as plasticizers or plasticizing agents, generally constitute between about 0.5 to about 15.0% by weight of the chewing gum. Softeners contemplated by the present invention include glycerin, lecithin and combinations thereof. Further, aqueous sweetener solutions such as those containing sorbitol, hydrogenated starch hydrolyzate, corn syrup and combinations thereof may be used as softeners and binding agents in gum.

As mentioned above, the powdered erythritol bulk sweetener of the present invention may be used in sugar gum formulations. However, sugar-free formulations are also within the scope of the invention. Sugar sweeteners generally include saccharide-containing components commonly known in the chewing gum art which comprise, but are not limited to, sucrose, dextrose, maltose, dextrin, dried invert sugar, fructose, levulose, galactose, corn syrup solids and the like, alone or in any combination.

The powdered erythritol sweetener of the present invention can also be used in combination with other sugarless sweeteners. Generally sugarless sweeteners include components with sweetening characteristics but which are devoid of the commonly known sugars and comprise, but are not limited to, sugar alcohols such as sorbitol, mannitol, xylitol, hydrogenated starch hydrolyzate, maltitol and the like, alone or in any combination.

Depending on the particular sweetness release profile and shelf-stability needed, the erythritol solid bulk sweetener of the present invention can also be used in combination with coated or uncoated high-intensity sweeteners or with high-intensity sweeteners coated with various materials and by various techniques. High-intensity sweeteners, preferably aspartame, may be used at levels from about 0.01% to about 3.0%.

Flavors contemplated by the present invention include any liquid flavoring which is of food acceptable quality. The flavor may comprise essential oils, synthetic flavors, or mixtures thereof, including but not limited to oils derived from plants and fruits such as citrus oils, fruit essences, peppermint oil, spearmint oil, clove oil, oil of wintergreen, anise, and the like. Artificial flavoring components are also contemplated by the present invention. Those of ordinary skill in the art will recognize that natural and artificial flavors may be combined in any sensorially acceptable blend. All such flavors and blends are contemplated by the present invention.

Flavors may be present in the chewing gum in an amount within the range of from about 0.1% to about 10%, preferably from about 0.5% to about 3.0%, of the gum.

Optional ingredients such as colors, emulsifiers and pharmaceutical agents may also be added as separate components of the chewing gum composition, if not added as part of the gum base.

Mannitol can be added directly to the mix, or used as a rolling compound, i.e., a non-hygroscopic material added in powdered form to the surface of sticks of gum to prevent the sticks of gum from sticking to machinery, wrapping papers, and the like.

Other conventional gum ingredients may also be included. Encapsulated aspartame is a high-intensity sweetener with improved stability and release characteristics, as compared to free aspartame. Free aspartame can also be added, and a combination of some free and encapsulated aspartame is preferred.

Aqueous syrups, such as corn syrup and hydrogenated corn syrup may be used, particularly if their moisture content is reduced. This can preferably be done by coevaporating the aqueous syrup with a plasticizer, such as glycerin or propylene glycol, to a moisture content of less than 10%. Preferred compositions include hydrogenated starch hydrolyzate solids and glycerin. Such syrups and their methods of preparation are discussed in detail in U.S. Pat. No. 4,671,967, incorporated herein by reference.

A preferred method of manufacturing chewing gum according to the present invention is by sequentially adding the various chewing gum ingredients to any commercially available mixer known in the art. After the ingredients have been thoroughly mixed, the gum base is discharged from the mixer and shaped into the desired form such as by rolling into sheets and cutting into sticks, extruding into chunks, or casting into pellets.

Generally, the ingredients are mixed by first melting the gum base and adding it to the running mixer. The base may also be melted in the mixer itself. Color or emulsifier may also be added at this time. A softener such as glycerin may be added at this time, along with syrup and a portion of the bulking agent. Further portions of erythritol and other bulking agents may be added to the mixer. Flavor is typically added with the final portion of the bulking agent. Other optional ingredients are added in the batch in a typical fashion, well known to those of ordinary skill in the art. It is conventional to cool the gum prior to wrapping, so as to make the gum more manageable.

There are two common ways of expressing the tendency of a material to hold moisture or pick it up from the atmosphere, namely equilibrium moisture content and equilibrium relative humidity. The hygroscopicity of materials is best expressed as their equilibrium moisture content, which varies with the relative humidity of the atmosphere surrounding the material under consideration. The equilibrium moisture content of erythritol increases gradually up to about 90% relative humidity; at 85% relative humidity and 20° C. it is 0.1%. Above 90% relative humidity, however, the equilibrium moisture content of erythritol increases dramatically. At 93% relative humidity and 20° C., the equilibrium moisture content of erythritol is about 2%. By way of comparison, at 80% relative humidity and 25° C., the equilibrium moisture content of glycerin is 49%. The equilibrium moisture contents of fructose, sorbitol, dextrose and sucrose at 78% relative humidity and 20° C. are 45%, 33%, 5% and 3%, respectively. At 77% relative humidity and 26.7° C., the equilibrium moisture contents of dextrose, sucrose and mannitol are 0.6%, 0.3% and 0.2%, respectively. At 78% relative humidity and 20° C., the equilibrium moisture content of xylitol is 7%.

The measurement of equilibrium relative humidity is a technique used to identify the tendency of a composition to lose or gain water at a given relative humidity. ERH is measured by storing sticks of the gum in various relative humidity conditions and measuring their loss or gain of weight after a sufficient time. The weight change is attributed to loss or gain of water. The ERH value of a gum composition is the relative humidity at which the gum will neither gain nor lose water. For example, an ERH of 50% means that a gum with such an ERH which is stored in a relative humidity of 50% remains stable, neither gaining nor losing moisture. A gum having an ERH close to the ambient relative humidity will presumably have a longer shelf life than a gum which has an ERH which is either lower or higher than the ambient relative humidity. Typical sugar-containing gums will have an ERH on the order of 40 to 50%, while so-called "anhydrous" gums may have an ERH of 15 to 25%. Gum with a very low ERH will pick up water and soften, and may as a result undergo undesirable changes such as recrystallization. Gum which has an ERH higher than the ambient relative humidity will harden and become tough and crumbly upon loss of water.

ERH is an indication of whether or not a gum will gain or lose water in a particular environment, but is not in itself an indication of how fast a gum will gain or lose water (i.e., the rate at which the water content of the gum will change). In general, the more glycerin or other hygroscopic ingredients there are in a gum, the lower will be its ERH, and the more quickly the gum will absorb water at relative humidities above the ERH for the gum. On the other hand, the more water there is in a gum, the higher will be its ERH, and the more quickly the gum will lose water at relative humidities below the ERH for the gum. The effects of hygroscopic ingredients and water content on ERH may be balanced by increasing both hygroscopic ingredients and water, but their effects on rate of change of water content are not balanced. Increasing both hygroscopic ingredients and water content in gums in the proper proportions may not change the ERH of the gum, but it will increase the tendencies of the gum both to gain and to lose water at relative humidities above and below the ERH for the gum, respectively.

The key to the present invention is the discovery of the ability to use erythritol as a low moisture pick-up sweetener/bulking agent which can be included in amounts to replace the sugar alcohol in sugarless gum composition to 1) reduce the moisture pick-up over a period of time and 2) to provide structural integrity simultaneously with a soft chew characteristic.

Experiments were conducted to compare the chewing gum composition of the present invention with sugarless, anhydrous compositions prepared with other polyols. Paloja chewing gum base used in the following Examples is commercially available from the L. A. Dreyfus Company in Plainfield, N.J. The "glycerin" used in the Examples was actually 99% glycerin and 1% water, which naturally is present in glycerin exposed to the atmosphere, owing to the hygroscopic nature of glycerin. Glycerin containing up to 4% water is frequently used in chewing gums, and even when containing 4% water, it is highly hygroscopic.

Several samples of chewing gum were made with erythritol, gum base and flavor. For comparison purposes, other gum samples with xylitol and sorbitol were also made. The formula are in Tables 1 and 2 below.

TABLE 1

(in weight percent)

|  | Ex. 1 | Ex. 2 | Ex. 3 | Ex. 4 | Comparative Ex. A | Comparative Ex. B |
|---|---|---|---|---|---|---|
| Paloja Gum Base | 30.0 | 30.0 | 30.0 | 30.0 | 30.0 | 30.0 |
| Xylitol | — | — | — | 34.35 | 68.7 | 64.7 |
| Erythritol | 68.7 | 64.7 | 64.7 | 34.35 | — | — |
| Glycerin | — | 4.0 | 2.0 | — | — | 4.0 |
| Water | — | — | 2.0 | — | — | — |
| Flavor | 1.3 | 1.3 | 1.3 | 1.3 | 1.3 | 1.3 |

TABLE 2

(in weight percent)

|  | Ex. 5 | Ex. 6 | Comparative Ex. C |
|---|---|---|---|
| Sorbitol | — | — | 57.932 |
| Erythritol | 57.932 | 65.932 | — |
| Gum Base | 24.43 | 24.43 | 24.43 |
| Lecithin | 0.15 | 0.15 | 0.15 |
| Aspartame | 0.22 | 0.2 | 0.22 |
| Mannitol | 8.0 | — | 8.0 |
| Glycerin | 7.697 | 7.697 | 7.697 |
| Flavor | 1.571 | 1.571 | 1.571 |

Figure 1:
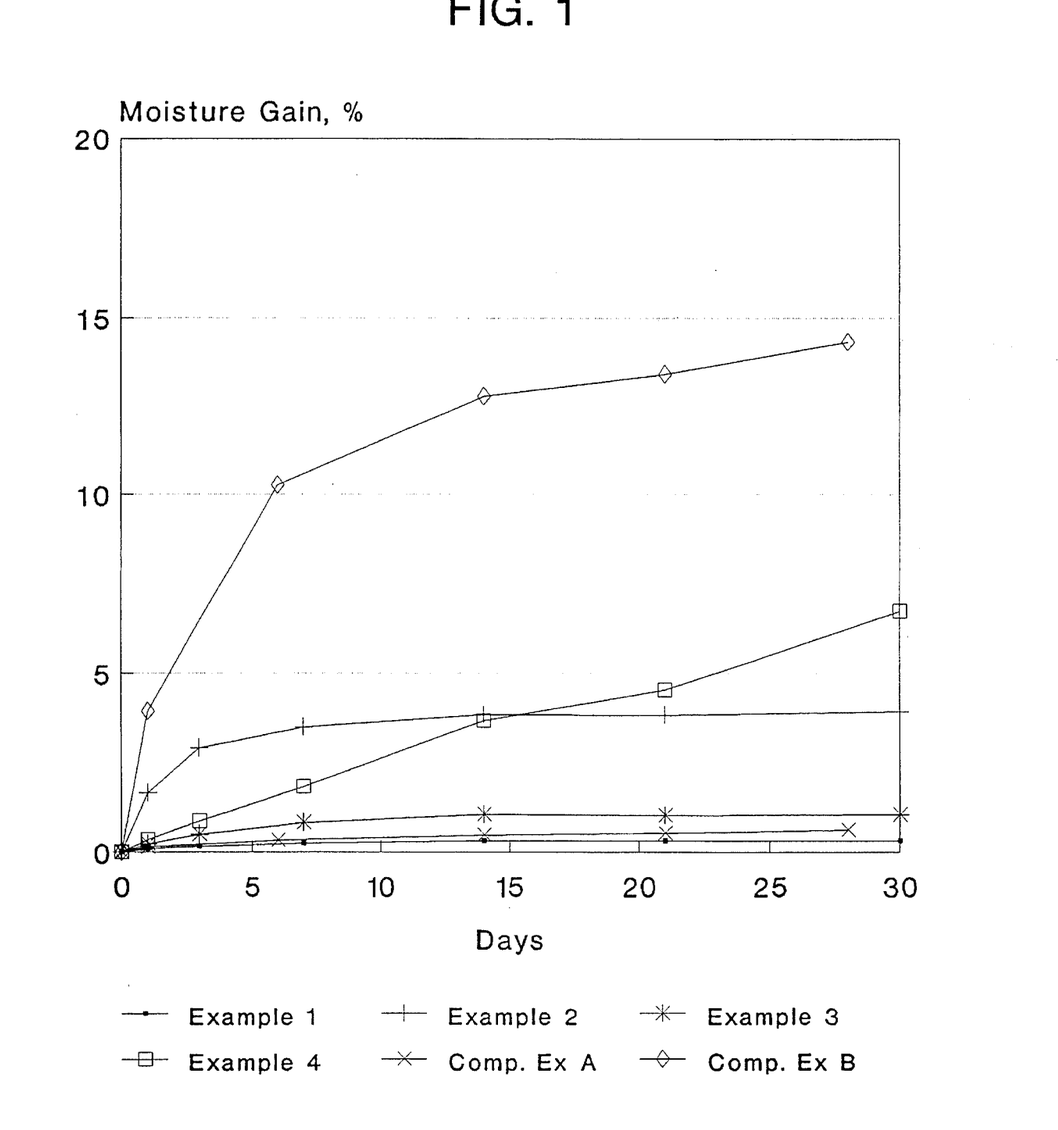
FIG. 1 is a graph showing the moisture gain of gum using erythritol and some comparative gum compositions stored at 79% RH.
Figure 2:
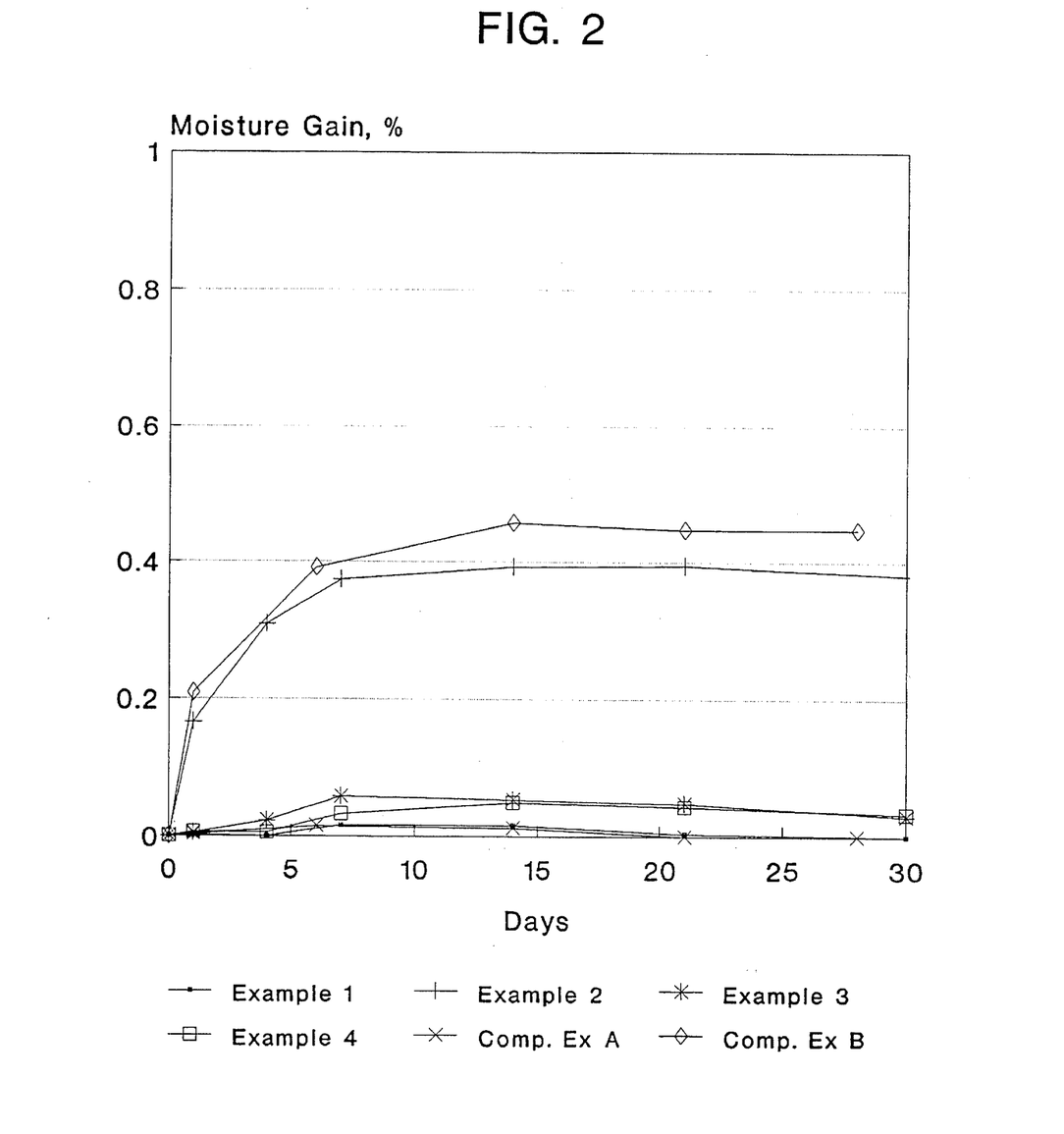
FIG. 2 is a graph showing the moisture gain of the gum samples of FIG. 1 stored at 33% RH.
Figure 3:
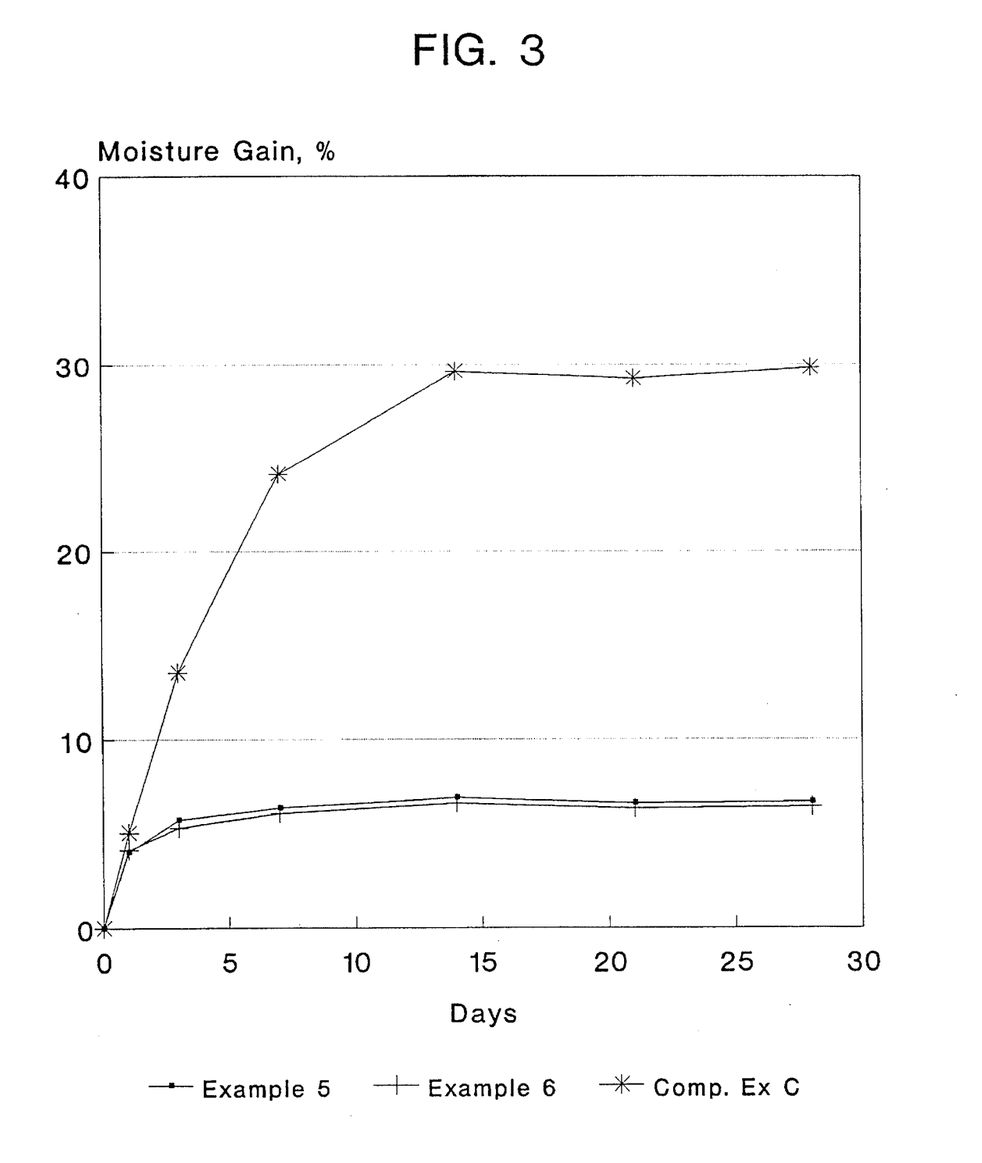
FIG. 3 is a graph showing the moisture gain of gum using erythritol as compared to another sample using sorbitol stored at 79% RH.
Figure 4:
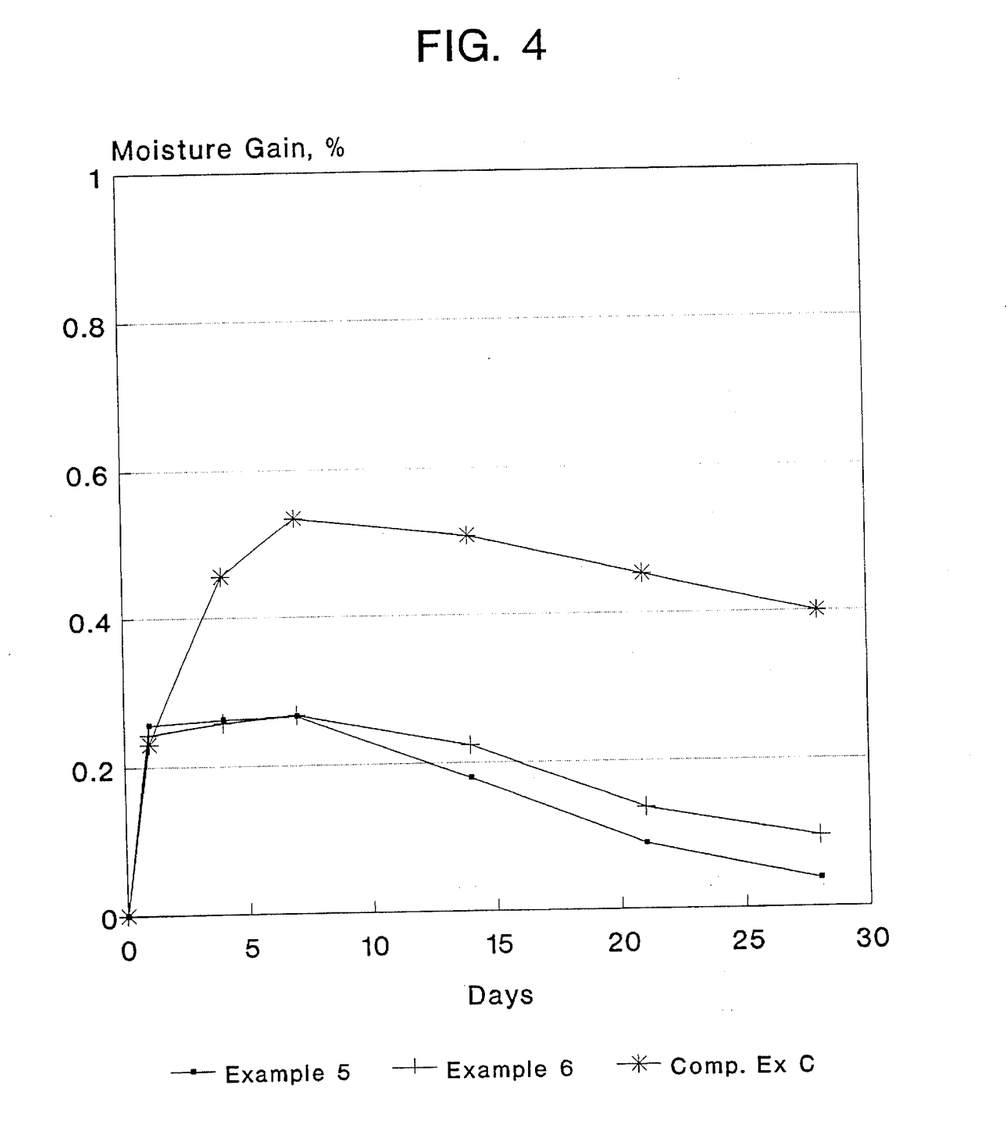
FIG. 4 is a graph showing the moisture gain of the gum samples of FIG. 3 stored at 33% RH.

The gums were sheeted and subjected to moisture gain/loss studies. The chewing gum samples were placed in desiccators at 79% RH, 74° F. and 33% RH, 74° F. These gum samples were then tested at 0, 1, 3, 6 or 7, 14, 21 and 28 or 30 days. The results of the moisture gain studies can be seen for 79% RH in FIGS. 1 and 3 and for 33% RH in FIGS. 2 and 4.

Xylitol was used as a control in the samples of Table 1 because it is known that xylitol chewing gum is environmentally stable. For Examples 1–4 and comparative Examples A–B, when the only difference between the gums is the polyol (erythritol or xylitol), erythritol gums are more stable than xylitol gums. Gums containing erythritol and 4% glycerin gained three and one half times less moisture than gums containing xylitol and 4% glycerin.

For Examples 5–6 and comparative Example C, the gums made with erythritol gained five times less moisture at 79% RH than the control gum with sorbitol and two times less moisture at 33% RH. Erythritol gum according to the inventive formula is also much more stable than conventional chewing gum containing sorbitol.

Figure 5:
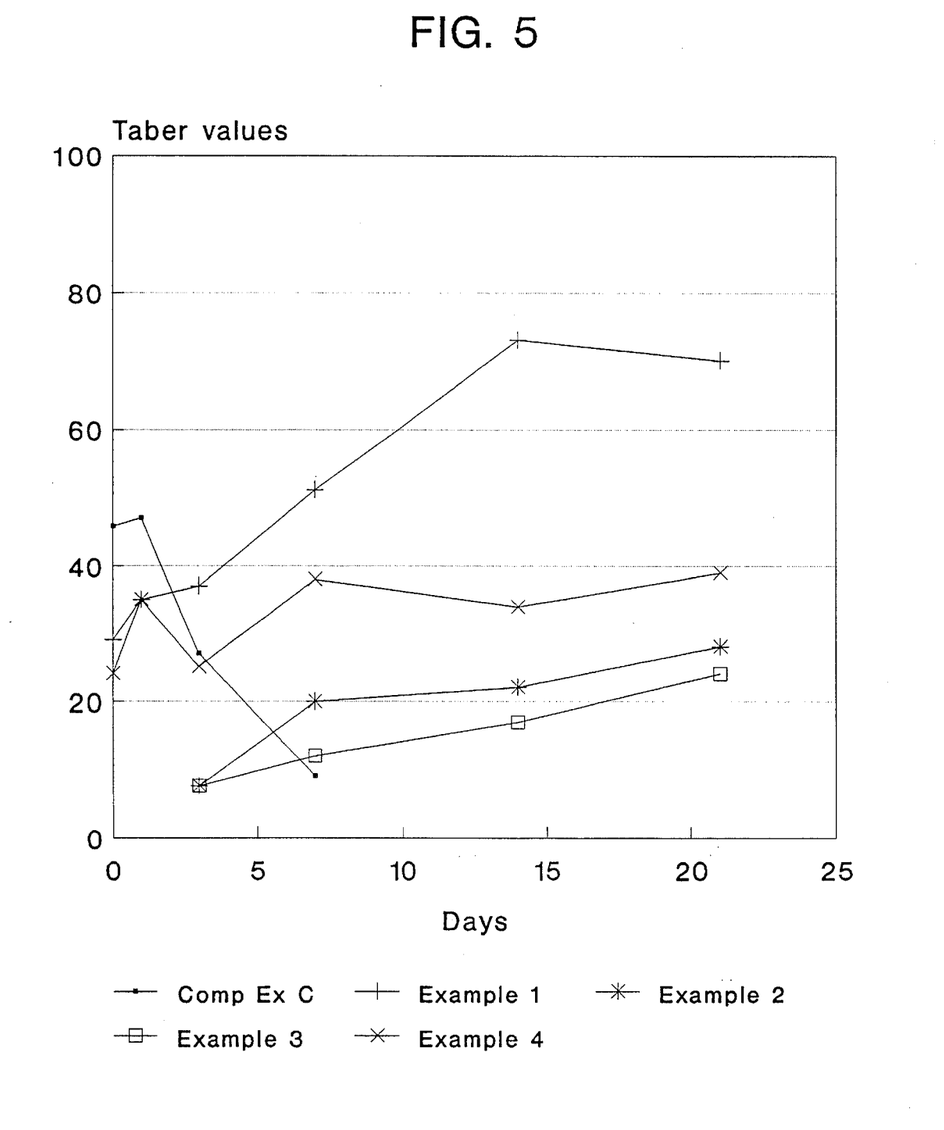
FIG. 5 is a graph showing the Tabor values over time for some of the gum samples from FIGS. 2 and 4 stored at 33% RH.

Taber stiffness measurements were made on some of the samples stored as outlined above. FIG. 5 shows the results from texture stability studies that were performed on Examples 1–4 and comparative Example C. Low Taber stiffness scores denote high flexibility and less stiffness. As shown in FIG. 5, comparative Example C, which contains sorbitol, is not as stable over time as the erythritol gums. The erythritol gums will continue to maintain their textural stability over time.

Additional gums were made according to the formulas in Tables 3 and 4 below. The coevaporated glycerin/Lycasin used in the formulas contained 67.5% hydrogenated starch hydrolyzate (HSH solids) from Lycasin brand HSH syrup from Roquette, 25% glycerin and 7.5% water.

TABLE 3

(in weight percent)

|  | Ex. 7 | Ex. 8 | Ex. 9 | Ex. 10 |
|---|---|---|---|---|
| Sorbitol | 43.03 | 28.965 | 14.90 | 52.93 |
| Erythritol | 14.90 | 28.965 | 43.03 | 5.00 |
| Gum Base | 24.43 | 24.43 | 24.43 | 24.43 |
| Mannitol | 8.00 | 8.00 | 8.00 | 8.00 |
| Lecithin | 0.15 | 0.15 | 0.15 | 0.15 |
| Coevaporated Glycerin/Lycasin | 7.70 | 7.70 | 7.70 | 7.70 |
| Aspartame | 0.22 | 0.22 | 0.22 | 0.22 |
| Flavor | 1.57 | 1.57 | 1.57 | 1.57 |

TABLE 4

(in weight percent)

|  | Comparative Example D | Ex. 11 |
|---|---|---|
| Sorbitol | 57.93 | — |
| Erythritol | — | 57.93 |
| Gum Base | 24.43 | 24.43 |
| Mannitol | 8.00 | 8.00 |
| Lecithin | 0.15 | 0.15 |
| Coevaporated Glycerin/Lycasin | 7.70 | 7.70 |
| Aspartame | 0.22 | 0.22 |
| Flavor | 1.57 | 1.57 |

Figure 6:
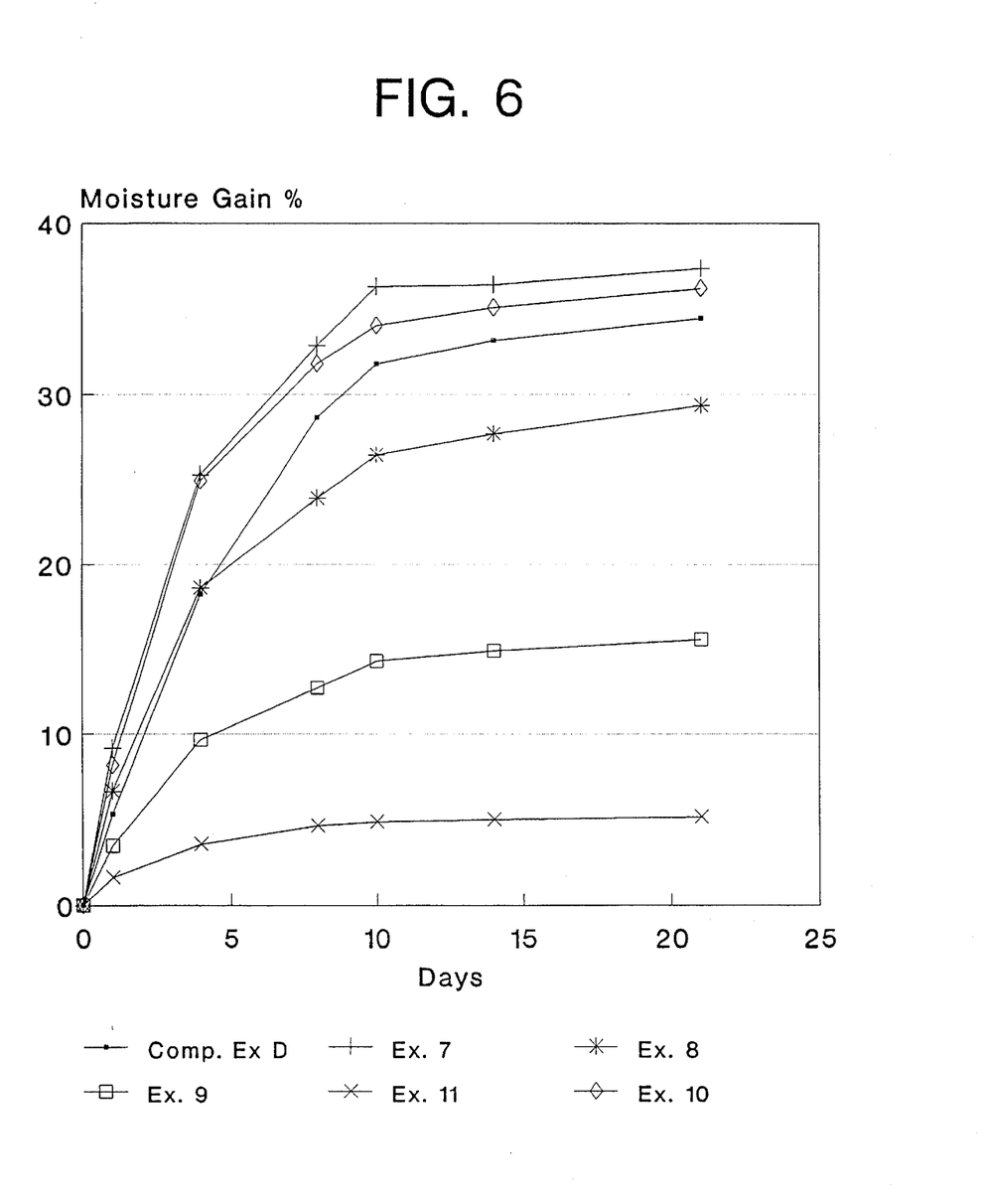
FIG. 6 is a graph showing the moisture gain of gum samples made with different amounts of sorbitol and erythritol stored at 79% RH.
Figure 7:
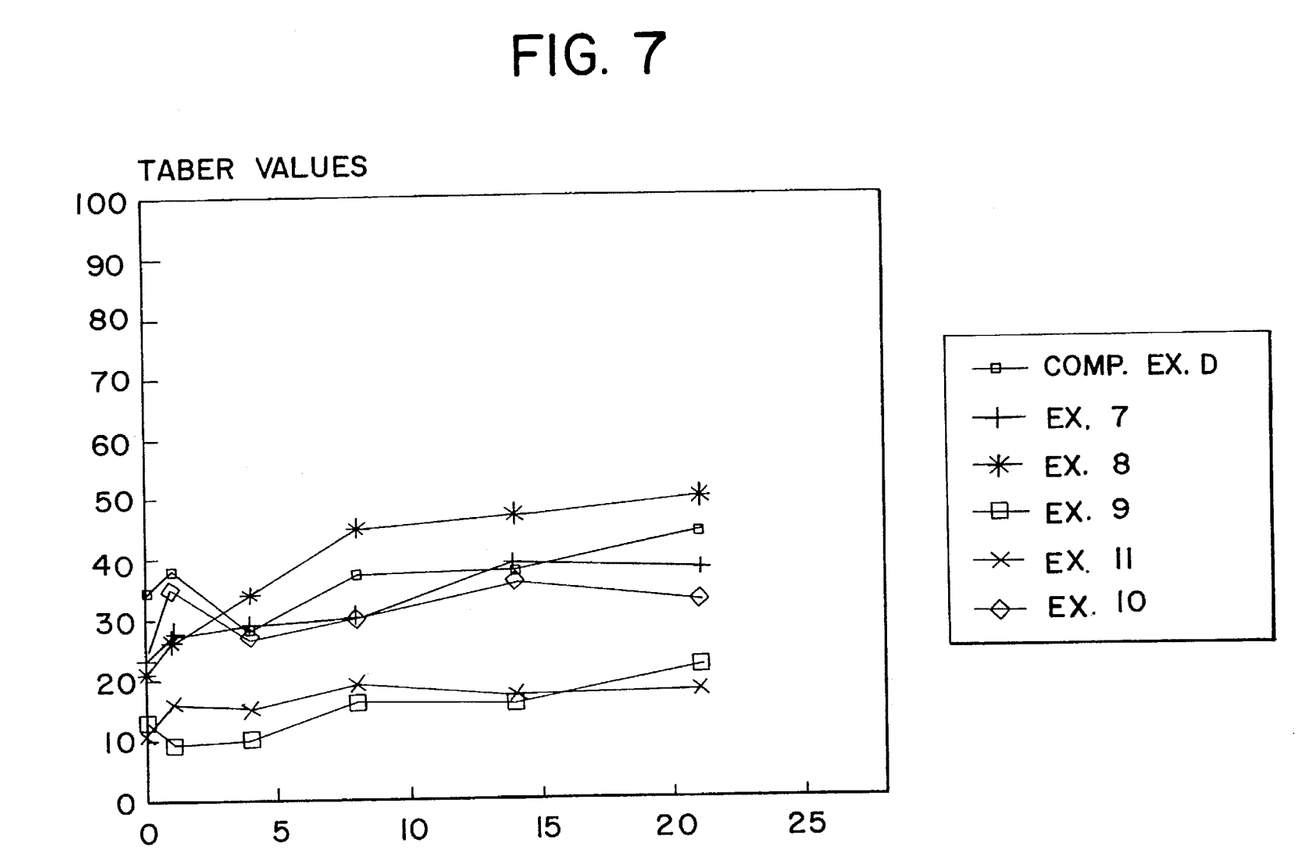
FIG. 7 is a graph showing the Tabor values over time for the gum samples of FIG. 6 stored at 33% RH.

The chewing gum samples of Table 3 and 4 were sheeted and subjected to moisture loss tests and texture stability tests. The samples were stored at 79% RH, 74° F. and 33% RH, 74° F. The moisture gain/loss study data was collected at 0, 1, 4, 8, 10, 14 and 21 days. The moisture gain at 79% RH is shown in FIG. 6. The gum samples with no or low levels of sorbitol and mostly erythritol had the lowest moisture gain. Interestingly, the samples that had some erythritol and some sorbitol had a higher moisture gain than samples without or with very little erythritol. Also, samples were measured for stiffness, using Taber stiffness measurements, at 1, 4, 8, 14 and 21 days. The Taber values of the samples stored at 33% RH are shown in FIG. 7. The samples with the least stiffness initially and over time contained a high level of erythritol.

Examples 12–15 in Table 5 demonstrate the use of erythritol in low-moisture gums that are sugar-free. Low-moisture gums have less than about 2% moisture.

TABLE 5

|  | (in weight percent) | | | |
| --- | --- | --- | --- | --- |
|  | EX. 12 | EX. 13 | EX. 14 | EX. 15 |
| BASE | 25.5 | 25.5 | 25.5 | 25.5 |
| SORBITOL | 46.0 | 46.0 | 34.0 | 10.0 |
| MANNITOL | 12.0 | 12.0 | 12.0 | 13.0 |
| GLYCERIN | 10.0 | 5.0 | 2.0 | 0.0 |
| FLAVOR | 1.5 | 1.5 | 1.5 | 1.5 |
| ERYTHRITOL | 5.0 | 10.0 | 25.0 | 50.0 |

Erythritol, either in powder or syrup form, may be used as the exclusive bulking agent and/or sweetener in a variety of chewing gum formulations, as in Tables 6 and 7, although when used, the erythritol syrup must be used at low levels or coevaporated with a plasticizer so that the gum has less than 2% moisture.

TABLE 6

|  | (in weight percent) | | | | |
| --- | --- | --- | --- | --- | --- |
|  | EX. 16 | EX. 17 | EX. 18 | EX. 19 | EX. 20 |
| GUM BASE | 29.2 | 30.5 | 35.5 | 32.5 | 40.0 |
| ERYTHRITOL | 69.8 | 68.0 | 61.0 | 64.0 | 55.5 |
| GLYCERIN | — | — | 2.0 | 2.0 | 2.0 |
| FLAVOR | 1.0 | 1.5 | 1.5 | 1.5 | 2.5 |

TABLE 7

|  | (in weight percent) | |
| --- | --- | --- |
|  | EX. 21 | EX. 22 |
| GUM BASE | 50.0 | 70.0 |
| GLYCERIN | 2.0 | 1.0 |
| ERYTHRITOL POWDER | 45.5 | 24.0 |
| ERYTHRITOL SYRUP | — | 2.0 |
| FLAVOR | 2.5 | 3.0 |

The formulations in Tables 6 and 7 do not contain sugars or other polyols. These formulations will give unique texture and flavor attributes. These formulations may also contain high-intensity, artificial sweeteners, from about 0.02% to about 0.1% for sweeteners like alitame, thaumatin and dihydrochalcones, and from about 0.1% to about 0.3% for sweeteners like aspartame, sucralose, acesulfame K and saccharin. The formulations in Tables 6 and 7 without the sugars and other types of polyols will also have good non-cariogenic and low caloric properties.

It should be appreciated that the compositions and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention, therefore, is indicated by the appended claims rather than by the foregoing description. All changes which come within the meaning and range of equivalency of the claims are to be embraced within their scope.

We claim:

1. A chewing gum composition with improved shelf life comprising:
   a) from about 5% to about 95%, by weight of the gum, of gum base;
   b) from about 4.9% to about 94%, by weight of the gum, of powdered erythritol; and
   c) from about 0.1% to about 10%, by weight of the gum, of flavor;
   d) the gum composition containing less than 2% of water.

2. The chewing gum composition of claim 1, comprising from about 10% to about 50%, by weight of the gum, of gum base.

3. The chewing gum composition of claim 1, comprising from about 20% to about 30%, by weight of the gum, of gum base.

4. The chewing gum composition of claim 1, comprising from about 28% to about 69%, by weight of the gum, of powdered erythritol.

5. The chewing gum composition of claim 1, comprising from about 43% to about 59%, by weight of the gum, of powdered erythritol.

6. The chewing gum composition of claim 1, comprising from about 0.5% to about 3.0% by weight of the gum, of flavor.

7. The chewing gum composition of claim 1, further comprising at least one member selected from the group consisting of dextrose, sucrose, colors, emulsifiers, pharmaceutical agents, fillers, high-intensity sweeteners, flavor enhancers, softeners, food acids, xylitol and mannitol.

8. The chewing gum composition of claim 7, comprising a high-intensity sweetener.

9. The chewing gum composition of claim 7, comprising lecithin as an emulsifier and a softening agent.

10. The chewing gum composition of claim 1, further comprising an aqueous syrup comprising a plasticizer and hydrogenated starch hydrolyzate solids coevaporated to less than 10% moisture.

11. The chewing gum composition of claim 1, further comprising about 0.01% to about 3% aspartame.

12. A method of giving a chewing gum composition an improved shelf life comprising the steps of:
   a) formulating the chewing gum composition with about 5% to about 95% gum base, about 4.9% to about 94% powdered erythritol and about 0.1% to about 10% flavor;
   b) making the gum composition with less than 2% moisture; and
   c) storing the chewing gum composition for at least 28 days before chewing the chewing gum composition.

13. A sugarless, substantially anhydrous chewing gum composition comprising in weight percent:
   a) a gum base in an amount of from about 5% to about 95%;
   b) a low-moisture pick-up, texturizing, sweetening/bulking agent comprising powdered erythritol in an amount from about 4.9% to about 94%; and
   c) a flavoring agent of from about 0.1% to about 10%; and
   d) wherein said erythritol provides to the gum composition textural integrity, a soft chew characteristic over a period of time, and reduced moisture pick-up, and maintains the gum composition in its substantially anhydrous state.

14. The composition of claim 13 wherein said erythritol is included in an amount of from about 28% to 69%.

15. The composition of claim 13 which further comprises a high-intensity sweetener in an amount of from about 0.01% to about 3.0%.

16. The composition of claim 15 wherein said high-intensity sweetener is included in an amount of from about 0.025% to about 1.5%.

17. The composition of claim 13 wherein said flavor component is included in an amount from about 0.5% to about 3.0%.

18. The composition of claim 13 wherein said erythritol is included in an amount of from about 43% to about 59%.

* * * * *